W. H. GAHAN.
TIRE PROTECTOR.
APPLICATION FILED JULY 9, 1915.
1,185,084.
Patented May 30, 1916.
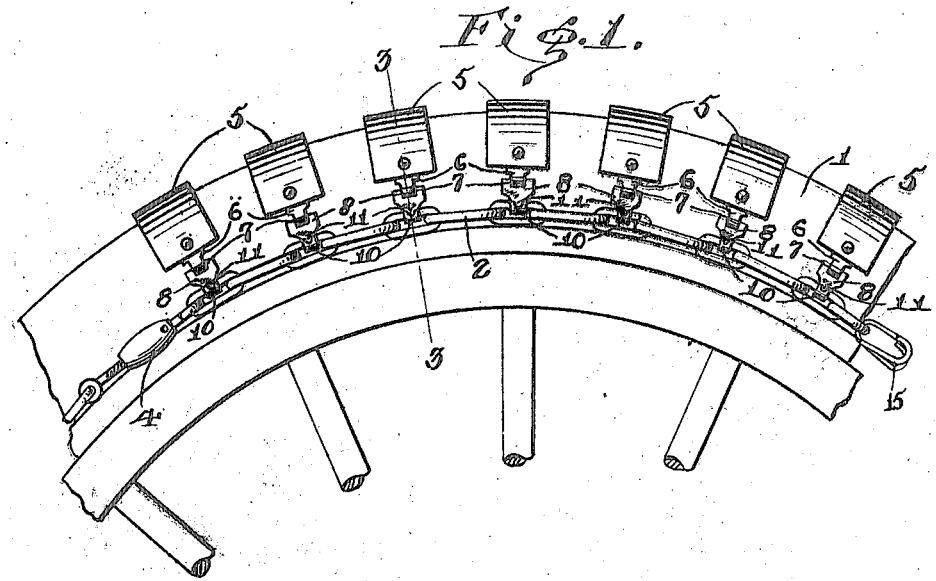
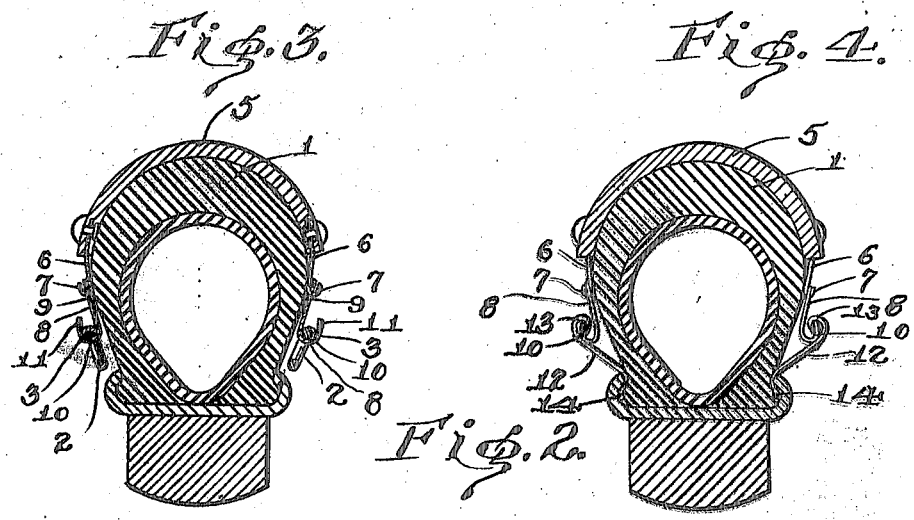
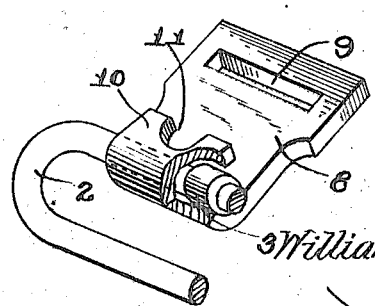
Inventor
William H. Gahan
Witnesses
By
Attorneys

UNITED STATES PATENT OFFICE.

WILLIAM H. GAHAN, OF VICTORIA, BRITISH COLUMBIA, CANADA.

TIRE-PROTECTOR.

1,185,084.  Specification of Letters Patent.  Patented May 30, 1916.

Application filed July 9, 1915. Serial No. 39,025.

*To all whom it may concern:*

Be it known that I, WILLIAM H. GAHAN, a subject of the King of England, residing at Victoria, in the Province of British Columbia, Dominion of Canada, have invented certain new and useful Improvements in Tire-Protectors; and I do hereby declare the following to be a full, clear, and exact description of the invention, such as will enable others skilled in the art to which it appertains to make and use the same.

The present invention is directed to improvements in tire protectors, and has for its object to so construct a device of this character that the same will effectually protect the tire against punctures.

A further object of the invention is to provide a tire protector so constructed that skidding of the tire will be prevented.

A still further object of the invention is to provide a protector of this nature which may be easily and quickly applied to the tire, and when in place thereon will prevent slipping of the tire both laterally and longitudinally of the vehicle.

With these and other objects in view, this invention resides in the novel features of construction, formation, combination and arrangement of parts to be hereinafter more fully described, claimed and illustrated in the accompanying drawing, in which:—

Figure 1 is a fragmentary side elevation of a wheel equipped with the device. Fig. 2 is a detail perspective view of the plates partially broken away. Fig. 3 is a sectional view on line 3—3 of Fig. 1. Fig. 4 is an end view of one of the sections when used as a patch.

Referring to the drawing 1 designates the usual pneumatic tire, and 2 the circularly arranged chains which are disposed on opposite sides of the tire, and have their links provided with bosses 3, the purpose of which will appear later. The ends of the chains 2 are connected by the coupling 4, which is operable to regulate the tension of the chains 2. Disposed transversely of the tire 1 are sections 5, said sections having fixed to each end plate 6, said plates being provided with hooks 7. Plates 8 are provided and are formed with transverse slots 9 which are adapted to be engaged by the hooks 7. The plates 8 are also provided with hooks 10 which are adapted to engage the chains 2, said hooks having their ends provided with recesses 11 so that the bosses 3 of the links may pass therethrough when engaging the hooks 10 with the chains. It will be noted that the ends of the hooks 10 are spaced from the plate 8 a sufficient distance to permit the links of the chain 2 to be engaged by the hooks, but it will be observed that the bosses 3 will prevent disengagement of the hooks 10 and links, owing to the fact that after the bosses are passed through the recesses 11 the links and hooks will have relative movement, whereby the bosses will move to such a position as to not aline with the recesses. Thus it will be seen that should the tire blow out during the travel of the vehicle, that the hooks 10 will not disengage the links of the chain 2, thereby preventing the connected sections and chains from winding in the wheel, thus preventing accidents. When it is desired to use one of the sections 5 as a patch for blow outs clips 12 are provided, said clips having hooks 13 adapted to engage the links of the chains 2, which are engaged by the hooks 10, said clips being further provided with curved lips 14, which are adapted to engage the rim of the wheel. The chains 2 may be lengthened or shortened for use in connection with wheels of different diameters by the addition or elimination of connecting rings 15.

What is claimed is:—

1. A tire protector comprising circularly arranged chains disposed on opposite sides of the wheel, means for adjusting the tension of the chains, sections formed of flexible material and disposed transversely of the tire, hooks carried by the ends of the sections, plates having slots formed therein for detachably engaging said hooks, said plates having hooks carried thereby and provided with recesses, the links of said chains being provided with bosses which pass through the recesses previous to the engagement of said hooks with the links, said bosses when non-alined with the recesses serving to prevent accidental disengagement of the last named hooks and links.

2. A tire protector comprising a plurality of sections disposed transversely of the tire and having plates detachably connected to their ends, hooks carried by the plates and provided with recesses and chains disposed on opposite sides of the wheel, the links of said chains having bosses therein for passage through the recesses for engaging the hooks, as and for the purpose set forth.

In testimony whereof, I affix my signature, in the presence of two witnesses.

HARRY GAHAN.

Witnesses:
AGNES H. ROBERTSON,
Mrs. J. G. DARBY.